US010800088B2

(12) United States Patent
Pagliarini

(10) Patent No.: US 10,800,088 B2
(45) Date of Patent: Oct. 13, 2020

(54) PROCESS STATION FOR A PARISON OR A CONTAINER MADE OF THERMOPLASTIC MATERIAL, APPARATUS FOR PROCESSING PARISONS OR CONTAINERS, PRODUCTION AND PACKAGING LINE FOR PRODUCING AND PACKAGING THE CONTAINERS AND METHOD FOR PRODUCING AND PACKAGING CONTAINERS

(71) Applicant: GEA PROCOMAC S.P.A., Sala Baganza (Parma) (IT)

(72) Inventor: Paolo Pagliarini, Parma (IT)

(73) Assignee: GEA PROCOMAC S.P.A., Sala Baganza (IT)

( * ) Notice: Subject to any disclaimer, the term of this patent is extended or adjusted under 35 U.S.C. 154(b) by 365 days.

(21) Appl. No.: 15/524,908

(22) PCT Filed: Dec. 16, 2015

(86) PCT No.: PCT/IB2015/059687
§ 371 (c)(1),
(2) Date: May 5, 2017

(87) PCT Pub. No.: WO2016/108124
PCT Pub. Date: Jul. 7, 2016

(65) Prior Publication Data
US 2017/0326778 A1    Nov. 16, 2017

(30) Foreign Application Priority Data
Dec. 30, 2014  (IT) ............... PR2014A0111

(51) Int. Cl.
*B29C 49/06*   (2006.01)
*B29C 49/46*   (2006.01)

(52) U.S. Cl.
CPC ............ *B29C 49/063* (2013.01); *B29C 49/46* (2013.01); *B29C 49/06* (2013.01);
(Continued)

(58) Field of Classification Search
CPC ....... B29C 49/063; B29C 49/46; B29C 49/06; B29C 49/4205; B29C 49/4252;
(Continued)

(56) References Cited

U.S. PATENT DOCUMENTS 5,759,218 A * 6/1998 Martin .................... B29C 49/46
264/525
8,197,245 B2  6/2012 Dordoni
(Continued)

FOREIGN PATENT DOCUMENTS

CN    102529069 A   7/2012
EP    0996530 A1    5/2000
(Continued)

*Primary Examiner* — Xiao S Zhao
*Assistant Examiner* — Ninh V Le
(74) *Attorney, Agent, or Firm* — Pearne & Gordon LLP

(57) ABSTRACT

A process station (1) for a parison or a container (2) made of thermoplastic material, comprising: a concave shell (3) configured to be applied onto the mouth (2b) of the individual parison or container (2) in such a manner as to enwrap at least partially the neck (2a) of the parison or container (2) so as to delimit a volume for treatment (4) of the neck (2a) subjected to plasma balls immersed in a carrier gas stream.

15 Claims, 5 Drawing Sheets

(52) U.S. Cl.
CPC .......... *B29C 2049/4632* (2013.01); *B29C 2049/4635* (2013.01); *B29C 2049/4655* (2013.01); *B29C 2049/4673* (2013.01); *B29C 2049/4682* (2013.01)

(58) Field of Classification Search
CPC .......... B29C 49/421; B29C 2049/4635; B29C 2049/4682; B29C 2049/4673; B29C 2049/4679; B65G 29/00; B65G 47/84; B65G 47/846; B65G 47/847; A61L 2/00; A61L 2/26; A61L 2202/23; B67C 7/004; B67C 7/0073; B67C 7/0086
See application file for complete search history.

(56) References Cited

U.S. PATENT DOCUMENTS

| | | |
|---|---|---|
| 8,435,024 B2 | 5/2013 | Dordoni |
| 8,482,206 B2 | 7/2013 | Pouvesle et al. |
| 9,186,856 B2 | 11/2015 | Pagliarini et al. |
| 2010/0272844 A1 | 10/2010 | Dordoni |
| 2011/0018444 A1 | 1/2011 | Pouvesle et al. |
| 2012/0164258 A1 | 6/2012 | Dordoni |
| 2014/0103584 A1 | 4/2014 | Pagliarini et al. |
| 2014/0144105 A1* | 5/2014 | Hayakawa ............ B67C 7/0073 53/453 |

FOREIGN PATENT DOCUMENTS

| | | |
|---|---|---|
| EP | 1357081 A1 | 10/2003 |
| EP | 2008667 A1 | 12/2008 |
| EP | 2138298 A2 * | 12/2009 |
| EP | 2246176 A1 | 11/2010 |
| EP | 2279850 A1 | 2/2011 |
| EP | 2340157 A1 | 7/2011 |
| EP | 2643142 A1 | 10/2013 |
| EP | 2689913 A2 | 1/2014 |
| JP | H0939110 A | 2/1997 |
| JP | WO2013/021882 A1 * | 2/2013 |
| WO | 9903667 A1 | 1/1999 |
| WO | 2009050240 A1 | 4/2009 |
| WO | 2013021882 A1 | 2/2013 |

* cited by examiner

PROCESS STATION FOR A PARISON OR A CONTAINER MADE OF THERMOPLASTIC MATERIAL, APPARATUS FOR PROCESSING PARISONS OR CONTAINERS, PRODUCTION AND PACKAGING LINE FOR PRODUCING AND PACKAGING THE CONTAINERS AND METHOD FOR PRODUCING AND PACKAGING CONTAINERS

TECHNICAL FIELD

The object of the present invention is a process station for a parison or a container made of thermoplastic material, an apparatus for processing parisons or containers, a production and packaging line for producing and packaging containers and a method for producing and packaging containers.

The reference sector is the bottling of so-called "sensitive" food products, that is, products that are particularly sensitive to bacteriological contamination and oxidation, such as, for example, isotonic drinks, juices, nectars, soft drinks, tea, milk-based drinks, coffee-based drinks, etc., for which the prevention of possible microbiological contamination throughout all packaging stages is of fundamental importance.

BACKGROUND ART

Packaging lines using aseptic technology are already known in the prior art, wherein the various operations take place in a controlled contamination environment, so that the bottled products can be stored for a prolonged period of time and have chemical/physical and organoleptic stability even at room temperature.

In the earliest installations, production of the containers was carried out in non-aseptic apparatuses and the subsequent transfer of the containers formed was carried out inside a clean room housing at least the filling machine and the capping machine.

Aside from differences in design, a "conventional" aseptic bottling line envisages:
moulding the container starting with a parison made of a thermoplastic material;
chemical sterilization of the moulded container;
rinsing, filling and capping of the filled container, to be carried out inside a clean room.

A clean room is a room with controlled contamination and that encloses the entire filling apparatus, including the process zones in which the containers are actually filled/capped, as well as the auxiliary zones in which the movement means for the filling/capping machine operates.

The main disadvantage of a white room is thus represented by its considerable volume, owing to which lengthy and costly sterilization procedures are required. Moreover, there is considerable waste of working fluids, for example sanitizing liquids and sterile air, and wear-related phenomena occur, for example affecting the filters needed for air purification suitable for generating overpressure within the clean room so as to prevent the entry of contaminating agents from the external environment.

A further disadvantage of using a clean room is related to the difficulty involved in performing procedures for format changes, maintenance or adjustments of machine parts, owing to the risk of contamination that such procedures entail. Even access to the clean room on the part of an operator thus proves to be particularly difficult.

The development of aseptic technology has moved in the direction of a reduction of the volumes that must be kept sterile.

A modern concept of an aseptic bottling line thus envisages:
sterilization of the parison using chemical agents or radiation sterilization;
"aseptic" forming of the container starting from the sterilized parison;
rinsing and capping of the filled container, to be carried out in a sterile environment.

In this regard, the Applicant has developed a forming apparatus for forming under aseptic conditions, in which the forming rotary carousel is protected by an isolation device suitable for defining a controlled-contamination environment, and the movement means for moving the carousel and moulds is located outside of said isolation device (see European patent EP2246176).

The preliminary sterilization stage involves all devices that come into contact with the parison subjected to forming by blowing and stretching, including for example the gripping members, the stretching rod and the blown air circuit. The Applicant has thus developed ad hoc solutions for the stretching rod (see European Patent EP 2340157) and for the blown air circuit (see European patent application EP 26443142).

In this manner, the Applicant has reached the point of developing a completely aseptic blow moulding machine and a bottling line in which the process zone for each operative unit is protected by a dedicated microbiological isolation device, from which the means for moving and handling parisons/containers is excluded (see European patent EP2279850).

The main drawback of this solution clearly lies in the marked complexity of the structure, the considerable space occupied by the sterile zones (though limited and shaped around the operative units) and in the difficulty of maintaining sterile conditions inside the isolation devices.

Furthermore, not all the manual procedures required during operation (e.g. removal of obstacles) can be performed with the use of handling gloves. In some cases, the isolator access door must be opened, resulting in the loss of sterile conditions. Upon completion of the procedure, the sterile conditions of the environment must be restored, resulting in an evident loss of time due to downtime of the line.

In such circumstances, even procedures for format changes prove to be long and somewhat difficult.

Continuing on in reducing the volumes to be sterilized and the time needed to perform sterilization procedures, we find the solution disclosed in document EP1357081, concerning a filling machine in which the isolator is toroidal in form and conformed to cover the areas around the neck of the containers.

This configuration originated in response to the brilliant idea of sterilizing only those surfaces of the containers that will come into contact with the filler product, that is to say, the internal surfaces of the containers or those surfaces close to the mouth, while excluding the external surfaces of the body of the containers.

Known in the sector as the "neck-ring isolator", this solution does, however, require the arrangement of a further confinement of the body zones of the containers for the purpose of preventing leakage of the sterilizing agent into the environment external to the toroidal isolator, with resulting health risks for the operators.

The neck-ring isolator thus consists in a single volume in which the necks of the containers transit and which, however, also contains auxiliary members and elements, such as parts of the transfer stars for example.

Therefore, the problems related to maintenance and/or to restoring sterile conditions remain even with the transition to a "neck-ring isolator" type of structural design.

DISCLOSURE OF THE INVENTION

Within this context, the technical task underlying the present invention is to offer a process station for a parison or a container made of thermoplastic material, an apparatus for processing parisons or containers, a production and packaging line for producing and packaging containers and a method for producing and packaging containers, which overcome the drawbacks of the prior art cited hereinabove.

In particular, an aim of the present invention is to make available a process station for a parison or a container made of thermoplastic material, an apparatus for processing parisons or containers, and a production and packaging line for producing and packaging containers, in which the volumes to be sterilized and the time needed to perform the sterilization procedures are further reduced with respect to the prior-art solutions.

A further aim of the present invention is to make available a method for producing and packaging containers more rapidly and easily, further reducing the downtime needed to restore sterile conditions along the line.

The defined technical task and the specified aims are substantially achieved by a process station for a parison or a container made of thermoplastic material, comprising:
  a concave shell configured to be applied onto the mouth of the individual parison or container in such a manner as to enwrap at least partially the neck of the parison or container so as to delimit a volume for treatment of the neck;
  a source of fluid that is operatively active on the volume to be treated, for supplying a flow of fluid around the neck of the parison or container for the purpose of preventing contaminants from entering the volume to be treated.

Preferably, the volume to be treated does not contain the bague of the parison or container.

In particular, the body of the parison or container is in an external environment set apart from the volume to be treated, but in fluid communication with the latter.

The source of fluid preferably consists in a plasma generator.

In particular, the plasma generator is configured to generate plasma balls immersed in a gas stream.

Alternatively, the source of fluid is a source of sterile air or a source of sterilizing gas.

In another variant embodiment, the source of fluid is a source of energized water.

In another variant embodiment, at least one UV lamp is present and operatively active on the volume to be treated so as to decontaminate it.

Preferably, the process station comprises movement means for moving the concave shell from a configuration for disengaging the mouth to a configuration for engaging the mouth.

In particular, the movement means comprises a guiding support on which the concave shell is slidably mounted.

Preferably, the guiding support has a prevalent extension substantially perpendicular to the axis of symmetry of the parison or container in such a manner that the concave shell can slide perpendicularly to this axis of symmetry.

The defined technical task and the specified aims are substantially achieved by an apparatus for processing parisons or containers made of thermoplastic material, comprising a plurality of process stations as described hereinabove. In particular, each process station has its own concave shell for defining the volume for treatment of the individual neck present therein.

For example, the process stations are moulding stations for moulding the parisons starting from granules of thermoplastic material.

For example, the process stations are forming stations for forming the containers.

For example, the process stations are filling stations for filling the containers.

The defined technical task and the specified aims are substantially achieved by a production and packaging line for producing and packaging containers, comprising a plurality of processing apparatuses as described hereinabove.

In particular, the process stations of each processing apparatus have concave shells that have a lateral surface that is counter-shaped with respect to the lateral surface of the concave shells of the process stations of the processing apparatus upstream or downstream.

The defined technical task and the specified aims are substantially achieved by a method for producing and packaging containers, comprising the following steps:
  forming the containers starting from the parisons;
  filling the containers with a filling product;
  applying a capsule to each container.

The following sub-steps are comprised in each one of the above-mentioned steps:
  applying a concave shell onto the mouth of the parisons or containers in such a manner as to enwrap at least partially the neck of the parisons or containers so as to delimit a volume for treatment of the individual neck;
  supplying a flow of fluid in the volume to be treated around the neck so as to prevent contaminants from entering the volume to be treated.

The sub-steps of applying the concave shell and supplying the flow of fluid in the volume to be treated are preferably performed continuously during the execution of each step, so that the mouth and at least part of the neck of all parisons and containers are always protected from contamination.

BRIEF DESCRIPTION OF DRAWINGS

Further characteristics and advantages of the present invention will become more apparent from the approximate and thus non-limiting description of a preferred, but not exclusive, embodiment of a process station for a parison or a container made of thermoplastic material, an apparatus for processing parisons or containers, a production and packaging line for producing and packaging containers and a method for producing and packaging containers, as illustrated in the attached drawings, of which.

DETAILED DESCRIPTION OF PREFERRED EMBODIMENTS OF THE INVENTION

Figure 1:
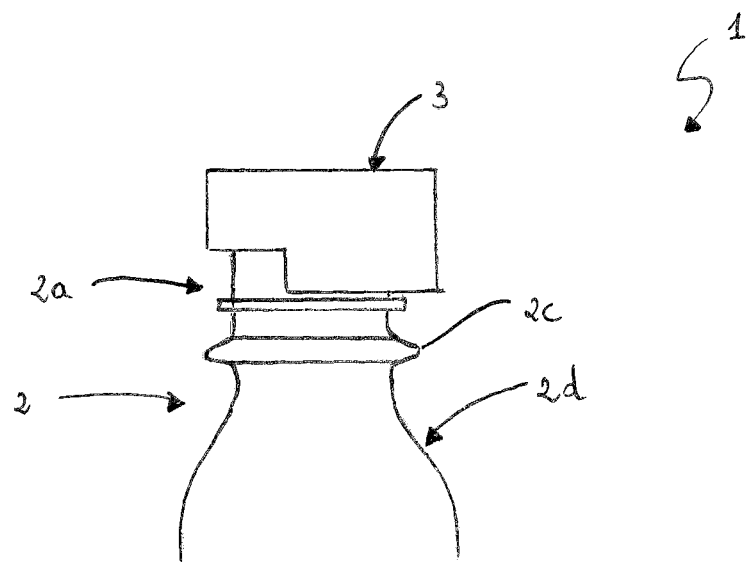
FIGS. 1 and 2 illustrate the neck zone of a parison or container, to which a concave shell has been applied in a process station, according to the present invention, in a side view and a sectional side view, respectively.
Figure 2:
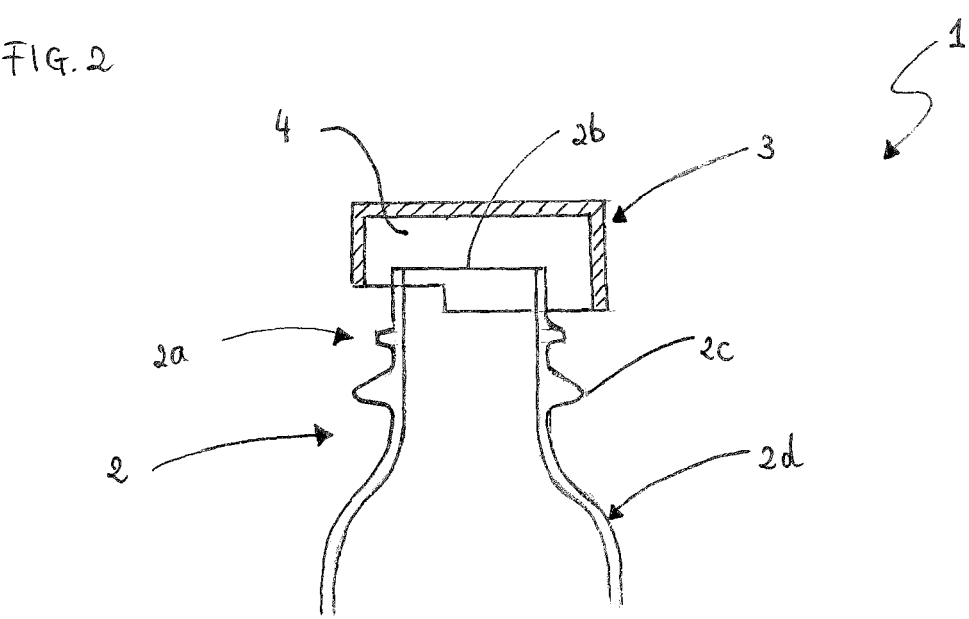
Figure 3:
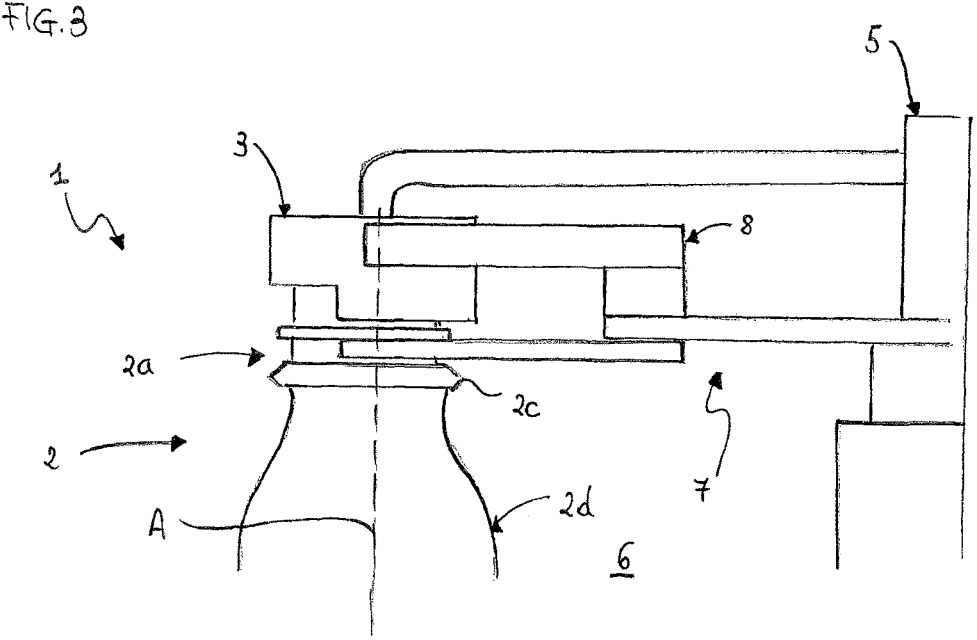
FIG. 3 is a side view illustrating a process station for a parison or a container made of thermoplastic material, according to the present invention.

With reference to the figures, the number 1 indicates a process station for a parison or a container 2 made of thermoplastic material.

As is known, the neck of a parison does not undergo processing and therefore it coincides with the neck of the formed container. This neck is indicated by the identification number 2a.

Originally, the process station 1 comprises a concave shell 3 configured to be applied onto the mouth 2b of the individual parison or the container 2 in such a manner as to enwrap at least partially the neck 2a of the parison or container 2.

The concave shell 3 thus delimits a volume for treatment confined around the neck 2a of the individual container 2 (or parison), thereby also protecting the internal surface thereof that will come into contact with the filling product (e.g. a beverage).

The process station 1 comprises a source 5 of fluid that is operatively active on the volume to be treated 4, for supplying a flow of fluid around the neck 2a of the parison or container 2 for the purpose of preventing contaminants from entering the volume 4 to be treated.

Preferably, the flow of fluid is a laminar type of flow.

The body 2d of the parison or container 2 is in an external environment 6 set apart from the volume 4 to be treated, but in fluid communication with the latter.

In the preferred embodiment, the source 5 of fluid consists in a plasma generator. In particular, the plasma generator is configured to generate plasma balls immersed in a gas stream. This technology is known as "plasma balls" in English.

The plasma generator preferably consists in the device disclosed in document WO2009/050240.

This device makes it possible to generate plasma directly in proximity to the neck 2a of the parison or container 2, using the atmosphere therein.

In other words, in the process station 1, a production action (e.g. moulding of the parison, thermal conditioning of the parison, forming of the container, filling of the container, capping of the container, etc.) is carried out and at the same time, a sterilizing action is carried out for sterilizing the atmosphere around the neck 2a and thus also the internal surface of the concave shell 3.

In a variant embodiment, the source 5 of fluid is a source of sterile air. The use of sterile air to keep the neck 2a zone fluxed is sufficient for example for applications in an aseptic line for packaging highly acidic products, for which four decimal reductions are generally required.

In an additional variant embodiment, the source 5 of fluid employed in aseptic lines for packaging products with low acidity is a source of sterilizing gas.

In a further variant embodiment, the source 5 of fluid is a source of energized water, that is, a source of water nanostructures activated by an electric field (i.e., Engineered Water Nanostructures, referred to by the acronym EWNS).

In another variant embodiment (unillustrated), at least one UV lamp is present and operatively active on the volume 4 to be treated so as to decontaminate it.

In particular, the UV lamp is located inside the concave shell 3.

Preferably, the volume 4 to be treated extends partially around the neck 2a so as to leave the bague 2c of the parison or container 2 outside of it. In this context, the technical term "bague" is understood as a protuberance on the circumference of the neck 2a of the parison or container 2, the protuberance being located below the threaded zone of the neck 2a.

The concave shell 3 is preferably movable between at least one configuration for disengaging the mouth 2b of the parison or container 2 and one configuration for engaging the mouth 2b.

For this purpose, a movement means 7 is provided for moving the concave shell 3.

In the embodiment described and illustrated herein, the movement means 7 for moving the concave shell 3 comprises a guiding support 8 on which the concave shell 3 is slidably mounted.

In particular, the guiding support 8 has a prevalent extension that is substantially perpendicular to the axis of symmetry A of the parison or container 2 so that the concave shell 3 can slide perpendicularly with respect to the axis of symmetry A.

Advantageously, the process station 1 proposed here can be used to perform various processing steps on a production and packaging line 100 for producing and packaging containers 2. For example, the process station 1 is a moulding station for moulding parisons or a forming station for forming containers, or a filling station or a closure application station or a gripping station.

Figure 4:
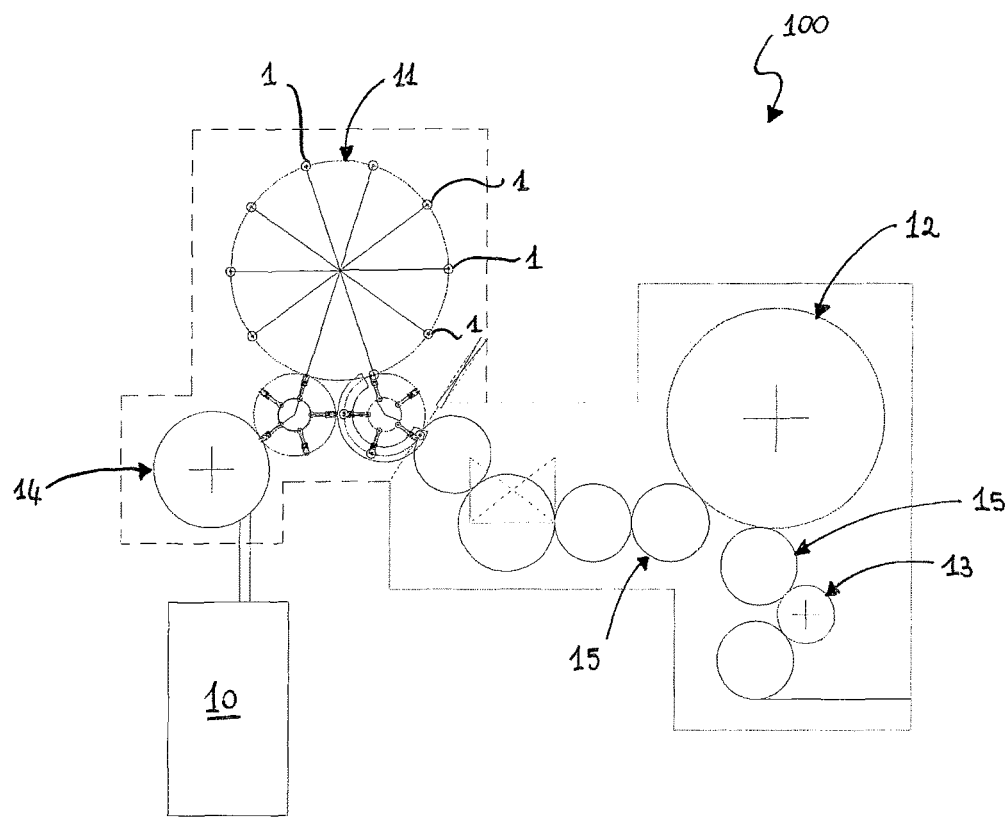
FIG. 4 is a plan view illustrating a production and packaging line for producing and packaging containers, according to the present invention.

FIG. 4 illustrates a production and packaging line 100 comprising a plurality of processing apparatuses 10, 11, 12, 13, 14, each of which, in turn, comprises a plurality of process stations 1.

The processing apparatuses 10, 11, 12, 13, 14 are of the rotary carousel or linear type.

Originally, each process station 1 has its own concave shell 3 that defines an individual volume 4 for treatment of the neck 2a of the parison or container 2 that has reached that process station 1.

In other words, each processing apparatus 10, 11, 12, 13, 14 has as many concave shells 3 and volumes for treatment 4 as there are process stations 1. Each volume 4 for treatment is separate and independent from the others. In other words, in each processing apparatus 10, 11, 12, 13, 14, each parison or container 2 has its own volume 4 for treatment of the neck 2a and it is separate and not shared with that of the other parisons/containers 2.

The production and packaging line 100 described and illustrated here comprises:
- a moulding apparatus 10 comprising a plurality of moulding stations 1 for moulding parisons 2 starting from granules of thermoplastic material;
- a forming apparatus 11 comprising a plurality of forming stations 1 for forming the containers 2;

a filling apparatus 12 comprising a plurality of filling stations 1 for filling the formed containers 2;

a closing or capping apparatus 13 comprising a plurality of closing or capping stations 1 for closing or capping the filled containers 2.

For example, the forming apparatus 11 is a blow moulding machine.

Preferably, a thermal conditioning apparatus 14 is provided, interposed between the moulding apparatus 10 for moulding the parisons 2 and the forming apparatus 11.

In particular, the thermal conditioning apparatus 14 comprises a plurality of thermal conditioning stations 1 for giving the parisons 2 a predefined thermal profile suitable for enabling forming by stretch-blowing. In fact, at the exit from the forming apparatus 11, the temperature of the parisons 2 is about 100° C., so that a thermal profiling step suitable for creating a gradient of temperatures along the axis of symmetry A of the parisons 2 is preferable, so as to render the latter suitable for forming by stretch-blowing.

For example, the thermal conditioning apparatus 14 is of the infrared or microwave type.

The production and packaging line 100 further comprises a plurality of transfer apparatuses or stars 15. Each of these transfer stars 15 comprises a plurality of gripping stations 1 for gripping the parisons or containers 2.

For example, grippers or jaws are provided in each gripping station and they grip the neck 2a of the parison or container 2.

Originally, the process stations 1 of each processing apparatus 10, 11, 12, 13, 14, 15 exhibit concave shells 3 that have a lateral surface that is counter-shaped with respect to the lateral surface of the concave shells 3 of the process stations 1 of the processing apparatus 10, 11, 12, 13, 14, 15 upstream or downstream.

In other words, the concave shells 3 of a processing apparatus are complementarily shaped with respect to the concave shells 3 of the following or preceding processing apparatus along the line 100.

Figure 5:
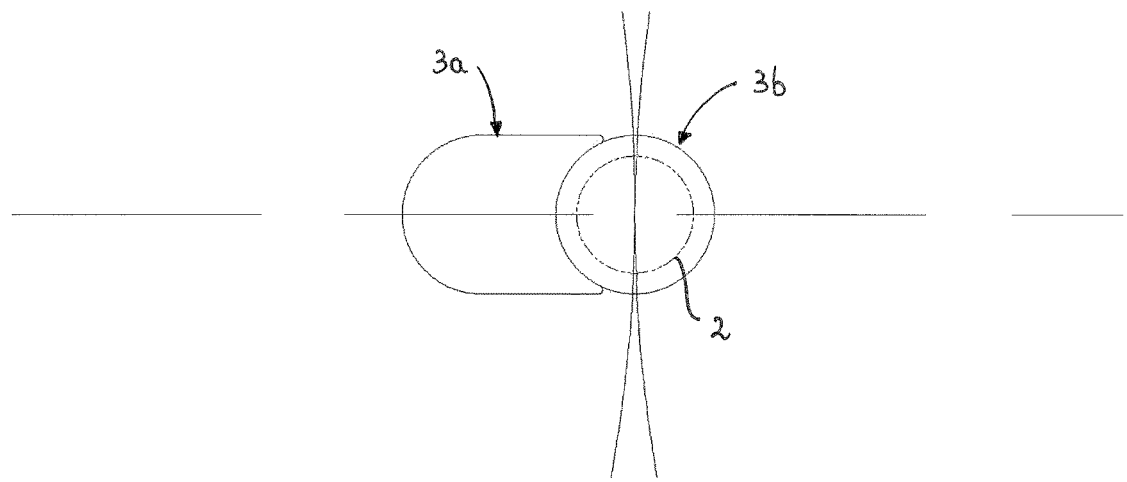
FIG. 5 is a plan view illustrating two concave shells belonging to two consecutive processing apparatuses, during the exchange of a parison or container.
Figure 6:
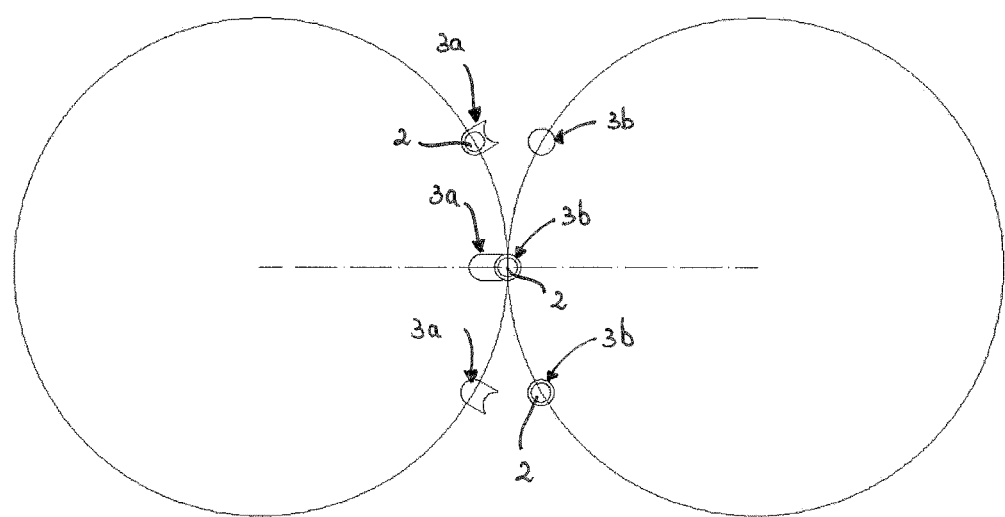
FIG. 6 is a plan view illustrating two processing apparatuses for processing parisons or containers, according to the present invention.
Figure 7:
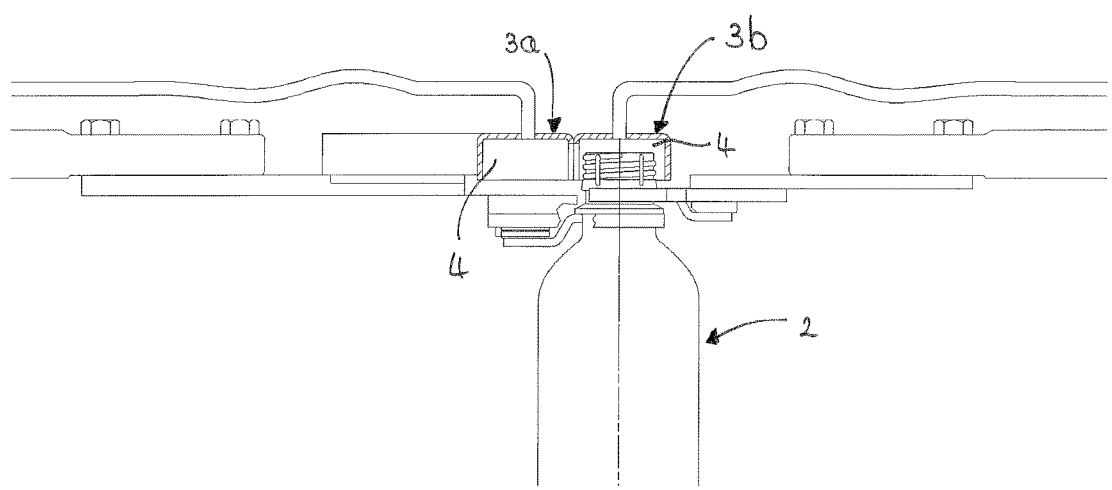
FIG. 7 is a sectional side view illustrating two concave shells belonging to two consecutive processing apparatuses, before the exchange of a container.
Figure 8:
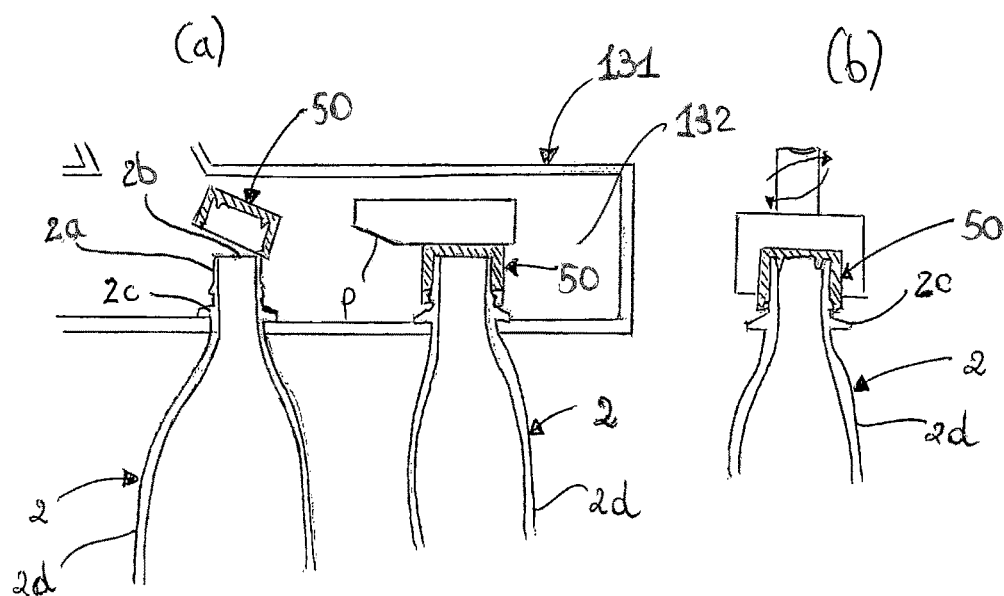
FIGS. 8a and 8b illustrate a step of resting and pressing a closure, and a step of tightening a closure on a container, respectively, in the closure apparatus of the line appearing in FIG. 4.

FIG. 5 is a plan view of two concave shells 3a, 3b belonging to two consecutive processing apparatuses. The first concave shell, indicated by the identification number 3a, is elongated in shape and has a groove on the lateral surface which is suitable for receiving the other concave shell, which is indicated by the number 3b and exhibits a circular shape in the plan view.

The method for producing and packaging containers, according to the present invention, is described below.

First of all, a step is provided for moulding the parisons 2 starting from granules of thermoplastic material.

In particular, the granules are melted and modelled in the respective moulding stations 1; in each moulding station there is a mould constituted by a concave portion (also called the "female mould") and a convex portion (also called the "male mould") that is insertable in the concave portion. For example, the parisons 2 are obtained by injection moulding or compression moulding or injection-compression moulding.

In each moulding station 1, once the parison 2 has been generated, the corresponding concave shell 3 takes on the configuration for engaging the mouth 2b so as to enwrap at least partially the neck 2a of the parison 2 and delimit the volume 4 for treatment of the neck. The source 5 of the fluid continuously supplies, that is, it supplies without interruption, the flow of fluid (e.g. plasma) in the volume 4 to be treated, keeping the neck 2a zone constantly fluxed.

At the end of the moulding step, the temperature of the parisons 2 is about 100° C. so that they are transferred to the thermal conditioning apparatus 14, which gives the parisons 2 a predefined thermal profile suitable for forming by stretch-blowing.

In each thermal conditioning station 1, upon arrival of the parison 2, the corresponding concave shell 3 takes on the configuration for engaging the mouth 2b so as to enwrap at least partially the neck 2a of the parison 2 and delimit the volume 4 for treatment of the neck.

The source 5 of fluid continuously supplies, that is, it supplies without interruption, the flow of fluid (e.g. plasma) in the volume 4 to be treated, keeping the neck 2a zone constantly fluxed.

Upon completion of thermal conditioning, the parisons 2 are transferred to the forming apparatus 11.

A mould comprising two half-portions hinged to each other and defining a cavity for housing a parison 2 is arranged in each forming station 1. The forming mould is of a known type, for example a "book mould" or an "alligator mould".

In particular, forming by stretch-blowing takes place by blowing a pressurized fluid through a nozzle or seal applied to the neck 2a of the parison 2 so as to create a tight seal on the bague 2c, and gradually inserting a stretching rod into the tubular body of the parison 2 so as to extend it. Forming by stretch-blowing is a known process and therefore it is not described in further detail herein.

In each forming station 1, upon arrival of the parison 2, the corresponding concave shell 3 takes on the configuration for engaging the mouth 2b so as to enwrap at least partially the neck 2a of the parison 2 (and then of the formed container) and delimit the volume 4 for treatment of the neck.

Preferably, the concave shell 3 in each forming station 1 is constituted by the seal.

The source 5 of fluid continuously supplies, that is, it supplies without interruption, the flow of fluid (e.g. plasma) in the volume 4 to be treated, keeping the neck 2a zone constantly fluxed.

Upon completion of the forming process, the containers 2 reach the filling apparatus 12.

A filling valve suitable for supplying a filling product inside the underlying container 2 is arranged in each filling station 1.

In each filling station 1, upon arrival of the container 2, the corresponding concave shell 3 takes on the configuration for engaging the mouth 2b so as to enwrap at least partially the neck 2a of the container 2 and delimit the volume 4 for treatment of the neck.

The source 5 of fluid continuously supplies, that is, it supplies without interruption, the flow of fluid (e.g. plasma) in the volume 4 to be treated, keeping the neck 2a zone constantly fluxed.

Once filled, the containers 2 move on to the closure apparatus 13 for application of the concave closures or the capsules.

Figure 9:
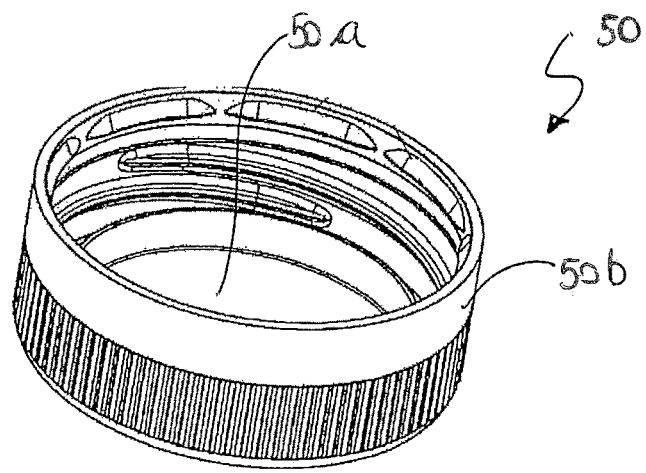
FIG. 9 is a perspective view illustrating a concave closure to be applied onto a container.

In this context, a concave closure 50 is understood as a capsule or cap comprising a base 50a and a lateral surface 50b that extends from the base 50a and defines therewith a cavity (see FIG. 9). On the end opposite the base, the closure 50 has an opening designed to receive the mouth 2b of a container 2.

Application of the concave closure 50 takes place by means of axial pressure downwards and then by screwing it around the neck 2a of the container 2. For this purpose, the lateral surface 50b of the closure 50 is internally threaded so as to be screwed onto the external thread of the neck 2a of the container 2.

The closing apparatus 12 preferably comprises at least two distinct units: an application unit for applying the concave closures 50 to the containers 2 and a tightening unit for tightening the closures 50 already applied to the containers 2.

In particular, the application unit for applying the closures 50 is configured to rest and press the closures 50 on the mouth 2b of the containers 2.

Preferably, in the application unit, each closure 50 is rested on the mouth 2b of the corresponding container 2 and then pressed on this mouth 2b.

In the embodiment described and illustrated herein, the closure 50 is dropped onto the mouth 2b of the container 2 by means of guides. This is referred to as a "a la volèe" grip in the bottling sector. The closure 50 is pressed onto the mouth 2b by means of a tilted plane P that the container 2 encounters while moving.

The "a la volèe" grip is a concept that is already known in the art, for example in non-aseptic cappers, and for this reason it is not described in further detail.

The application unit for applying the closures 50 preferably comprises a tunnel isolator 131 suitable for defining a controlled contamination environment 132 containing at least the neck 2a of the containers 2.

In particular, the volume of the controlled contamination environment 132 extends in an area limited to the neck 2a of the containers 2.

Unlike the concave shells 3 that individually cover a single neck 2a, in this case the isolator 131 defines an environment 132 shared by all the necks 2a of the containers 2.

In the tightening unit, each closure 50 is screwed to the neck 2a of the corresponding container 2 in such a manner as to seal it and create a tight seal.

The tightening unit preferably consists in a non-aseptic capper of a known type.

Preferably, between the capsule application unit and the tightening unit for tightening the capsules 50, a movement system for moving the containers is provided and it prevents contact between the containers. For example, this movement system comprises at least one transfer star bearing a plurality of grippers that are operatively active on the neck 2a of the containers 2. The movement without mutual contact serves the purpose of preventing the containers 2 from being crushed, which could cause the closures 50 to be lifted.

Advantageously, each parison/container 2 remains protected from contamination at all times along the line 100, as in each process station—be it a moulding station, a thermal conditioning station, a forming station, a filling station, a capsule application station, etc.—the mouth 2b and part of the neck 2a zone (and thus also the internal surface of the container 2) are found inside a volume 4 for treatment that is constantly subjected to a flow of fluid outwards.

In fact, in the transfer from one processing apparatus to another, the parison or container 2 leaves one process station 1 to be delivered to another process station 1. During this transfer, the parison or container 2 thus passes from one volume 4 for treatment to another. The continuity in sterile conditions during this passage is ensured by the counter-shaping of the lateral surfaces of the concave shells 3 and by the translation of the concave shells 3 along the corresponding guiding supports 8—measures such as these ensure that every neck 2a is constantly covered.

In particular, in transferring a parison/container 2 from one apparatus or from one star to another, the concave shell 3 of the star upstream can be stationary, while the concave shell 3 of the star downstream translates so as not to interfere with the concave shell 3 of the star upstream, though ensuring continuous covering on the neck 2a of the container 2.

Interference between these concave shells 3 is thus avoided owing to the radial retraction of one of the shells.

Moreover, the lateral profile of the concave shells 3 is provided with an opening that prevents having to provide for further vertical movements of the concave shells 3, which would complicate the structure.

The characteristics of the process station for a parison or a container made of thermoplastic material, of the processing apparatus for processing parisons or containers, of the production and packaging line for producing and packaging containers and of the method for producing and packaging containers, according to the present invention, prove to be clearly indicated in the description provided.

First of all, the volumes to be sterilized have been further reduced owing to the fact that in each individual process station (e.g. moulding, thermal conditioning, forming, filling, and capsule application stations) an individual volume for treatment of the neck of the parison or container is created.

Therefore, there has been a transition from a toroidal volume defined by the neck-ring isolator to a number of volumes limited to the individual neck zones.

The fact that each parison/container has an individual sterile volume, that is, a volume not shared with that of the other parisons/containers, allows for faster and safer maintenance procedures. For example, in the case of obstruction, one can intervene on the only container involved (and therefore on the corresponding volume being treated), while the other volumes being treated are not affected.

Likewise, format changes will prove to be easier, with a clear reduction in downtime and an increase in the flexibility of the apparatus and the line.

Having limited the volume for treatment to the single neck zones also makes it possible to concentrate the sterilization operations solely on the surfaces that actually require them, that is, the mouth, the area near the neck and the inside of the container, thereby avoiding sterilization of extremely extensive external surfaces of the body of containers or volumes (as was the case with the neck-ring isolator).

The preferred embodiment, which utilizes the prior-art technology known as "plasma balls", makes it possible to keep the neck zone fluxed continuously, thus generating plasma directly in proximity to the neck, using the atmosphere therein.

This technology is particularly indicated for open volumes for treatment (which are those defined by the concave shells) because this technology is safe for the operators and does not require further confinement of the body areas of containers.

Given that in each process station, a production action (e.g. moulding of the parison, thermal conditioning of the parison, forming, filling, capping, etc.) and a simultaneous sterilizing action are carried out, arranging units and steps exclusively dedicated to sterilization is no longer necessary.

In fact, sterilization is substantially concomitant with all the operative steps on the line.

In the embodiment specifically devised for applications with low acidity and employing a sterilizing gas, there is no risk for operators because a sterilizing gas with relatively low sterilization performance levels can be employed. The reason for this lies in the fact that the neck zone is kept fluxed at all times and this is not limited to the stages of environmental sterilization that precede production. In fact, during each process step for processing the parison/container, the neck zone is subjected to the flow of sterilizing gas at all times.

The sterilization cycles preceding the start of the production cycle of the line can therefore be reduced, thus resulting in a further reduction of downtime.

Furthermore, owing to the counter-shaping of the lateral surfaces of the concave shells of adjacent stars and to the radial degree of freedom of the concave shells, continuity of the sterile zone is ensured.

Therefore, a sterile zone extending along the entire line is no longer necessary, for a number of limited, separate sterile zones are sufficient, with these sterile zones being set in paired communication only in the transfer stage for transferring the parisons/containers from one star to another.

The invention claimed is:

1. A production and packaging line (100) for producing and packaging containers (2) made of thermoplastic material, comprising a plurality of processing apparatuses (10, 11, 12, 13, 14, 15) for processing said containers (2) or parisons having a neck (2a) with threaded zone and a bague (2c) located below said threaded zone, each of said processing apparatuses (10, 11, 12, 13, 14, 15) comprising a plurality of process stations (1), each of which in turn comprises:
    a concave shell (3) configured to be applied onto a mouth (2b) of the individual parison or container (2) in such a manner as to enwrap at least partially the neck (2a) of the parison or container (2) so as to delimit a volume (4) to be treated of said neck (2a), said volume (4) to be treated not containing the bague (2c) of said parison or container (2), each process station (1) having its own concave shell (3) for defining the volume (4) for treatment of the individual neck (2a) present therein;
    a source (5) of fluid that is operatively active on said volume (4) to be treated, for supplying a flow of fluid around the neck (2a) of the parison or container (2) for the purpose of preventing contaminants from entering said volume (4) to be treated,
wherein the process stations (1) of a first processing apparatus (10, 11, 12, 13, 14, 15) have concave shells (3) that have a lateral surface that is counter-shaped with respect to the lateral surface of the concave shells (3) of the process stations (1) of a second processing apparatus (10, 11, 12, 13, 14, 15) which follows or precedes the first processing apparatus (10, 11, 12, 13, 14, 15) along the production and packaging line (100).

2. The production and packaging line (100) according to claim 1, wherein a body (2d) of the individual parison or container (2) is in an external environment (6) that is set apart from said volume (4) to be treated, but in fluid communication therewith.

3. The production and packaging line (100) according to claim 1, wherein said source (5) of fluid comprises a plasma generator.

4. The production and packaging line (100) according to claim 3, wherein said plasma generator (5) is configured to generate plasma balls immersed in a gas stream.

5. The production and packaging line (100) according to claim 1, wherein said source (5) of fluid is a source of sterile air or a source of sterilizing gas.

6. The production and packaging line (100) according to claim 1, wherein said source (5) of fluid is a source of energized water.

7. The production and packaging line (100) according to claim 1, further comprising a UV lamp that is operatively active on said volume (4) to decontaminate it.

8. The production and packaging line (100) according to claim 1, further comprising a movement means (7) for moving said concave shell (3) from a configuration for disengaging said mouth (2b) to a configuration for engaging said mouth (2b).

9. The production and packaging line (100) according to claim 8, wherein said movement means (7) comprise a guiding support (8) whereon said concave shell (3) is slidably mounted.

10. The production and packaging line (100) according to claim 9, wherein said guiding support (8) has an extension substantially perpendicular to an axis of symmetry (A) of said parison or container (2) in such a manner that the concave shell (3) can slide perpendicularly to said axis of symmetry (A).

11. The production and packaging line (100) according to claim 1, wherein said process stations (1) of one of said processing apparatuses are moulding stations for moulding the parisons (2) starting from granules of thermoplastic material.

12. The production and packaging line (100) according to claim 1, wherein said process stations (1) of one of said processing apparatuses are forming stations for forming the containers (2).

13. The production and packaging line (100) according to claim 1, wherein said process stations (1) of one of said processing apparatuses are filling stations for filling the containers (2).

14. A method for producing and packaging containers (2) comprising the following steps:
    a) providing a production and packaging line (100) according to claim 1;
    b) forming the containers (2) starting from the parisons;
    c) filling the containers (2) with a filling product;
    d) applying a capsule (50) to each container (2);
characterized in that the following sub-steps are comprised in each of said steps b) through d):
    applying the concave shell (3) onto the mouth (2b) of the parisons or containers (2) in such a manner as to enwrap at least partially the neck (2a) of the parisons or containers (2) so as to delimit a volume (4) to be treated of the individual neck (2a), said volume (4) to be treated not containing said bague (2c);
    supplying a flow of fluid in said volume (4) to be treated around the neck (2a) of the parisons or containers so as to prevent contaminants from entering the volume (4) to be treated.

15. The method according to claim 14, wherein said sub-steps of applying the concave shell (3) and supplying the flow of fluid in the volume (4) to be treated are performed continuously during the execution of each of said steps b) through d) so that the mouth (2b) and at least part of the neck (2a) of all said parisons or containers (2) are always protected from contamination.

* * * * *